US008886562B1

(12) United States Patent
Talati et al.

(10) Patent No.: US 8,886,562 B1
(45) Date of Patent: Nov. 11, 2014

(54) ROBUST PAYMENT SETTLEMENTS USING DISTRIBUTED AND POTENTIALLY UNRELIABLE COMPUTER SYSTEMS

(75) Inventors: Mayank Talati, Sunnyvale, CA (US); Michael Schulman, New York, NY (US); Radhika Lakshmanan, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 1246 days.

(21) Appl. No.: 12/172,107

(22) Filed: Jul. 11, 2008

(51) Int. Cl.
*G06Q 40/00* (2012.01)

(52) U.S. Cl.
USPC ........ 705/39; 705/1; 705/14; 705/35; 705/38; 705/65; 713/165; 707/2; 395/615; 235/380

(58) Field of Classification Search
USPC ................ 705/1, 14, 35, 38, 39, 65; 713/165; 707/2; 395/615; 235/380
See application file for complete search history.

(56) References Cited

U.S. PATENT DOCUMENTS

| | | | | |
|---|---|---|---|---|
| 5,740,427 | A * | 4/1998 | Stoller | 395/615 |
| 6,141,653 | A | 10/2000 | Conklin et al. | |
| 6,212,635 | B1 * | 4/2001 | Reardon | 713/165 |
| 6,260,024 | B1 | 7/2001 | Shkedy | |
| 6,754,636 | B1 | 6/2004 | Walker et al. | |
| 7,428,524 | B2 * | 9/2008 | Burrows et al. | 707/2 |
| 2001/0016819 | A1 * | 8/2001 | Kolls | 705/1 |
| 2001/0025245 | A1 * | 9/2001 | Flickinger et al. | 705/1 |
| 2001/0034720 | A1 * | 10/2001 | Armes | 705/65 |
| 2002/0002468 | A1 * | 1/2002 | Spagna et al. | 705/1 |
| 2002/0029191 | A1 * | 3/2002 | Ishibashi et al. | 705/39 |
| 2002/0065752 | A1 * | 5/2002 | Lewis | 705/35 |
| 2002/0178074 | A1 | 11/2002 | Bloom | |
| 2003/0014307 | A1 * | 1/2003 | Heng | 705/14 |
| 2004/0059671 | A1 * | 3/2004 | Nozaki et al. | 705/39 |
| 2004/0167851 | A1 * | 8/2004 | Knowles et al. | 705/39 |
| 2004/0232221 | A1 * | 11/2004 | Beenau et al. | 235/380 |
| 2005/0055316 | A1 * | 3/2005 | Williams | 705/65 |
| 2006/0294002 | A1 * | 12/2006 | Brett | 705/38 |
| 2007/0045404 | A1 * | 3/2007 | Andersen et al. | 235/380 |

OTHER PUBLICATIONS

"FirePoppy, Broker Pro.," FirePoppy, Inc., 1 page, [Archived on web.archive.org on Aug. 22, 2003; Retrieved on May 19, 2011] Retrieved from the internet <URL:http://replay.web.archive.org/20030822021619/http://www.firepoppy.com/broker_pro.phtml>.

(Continued)

*Primary Examiner* — James Trammell
*Assistant Examiner* — Sanjeev Malhotra
(74) *Attorney, Agent, or Firm* — Johnson, Marcou & Isaacs, LLC

(57) ABSTRACT

Settlement transactions are processed on a distributed computer system. Settlement data describing a settlement request are received and stored in a settlement storage. The storage includes a request status field with a value describing the status of the settlement request. The settlement data are stored in a vendor file responsive to the value of the request status field. Data describing the vendor file are stored in a vendor file information storage. The vendor file information storage includes a file status field with a value describing the status of the vendor file. The vendor file is provided to a vendor for settlement processing responsive to the value of the file status field. The distributed computer system is able to detect and rectify errors in the distributed computer system by using the request status and file status fields, which allows the distributed computer system to be comprised of conventional computers.

16 Claims, 7 Drawing Sheets

(56) References Cited

OTHER PUBLICATIONS

"Shopatron FAQ," FirePoppy, Inc., 3 pages, [Archived on web.archive.org on Jan. 17, 2004; Retrieved on May 19, 2011] Retrieved from the internet <URL:http://replay.web.archive.org/20040117021450/http://www.firepoppy.com/FAQ.phtml>.

Letter from Ed Stevens, Fire Poppy, Inc. to Jim Hudson, Sullivan Products, dated Sep. 12, 2000, 6 pages.

Screenshots Shopatron (#1-#7), Shopatron, Ltd. 1999, 7 pages, [retrieved from the internet on Aug. 10, 2000] Retrieved from the internet <http://shopatron.ooi.net/shopping_cart.phtml>; <http://shopatron.ooi.net/checkout1.phtml>; <http://shopatron.ooi.netlcheckout3.phtml?multi=>; <http://shopatron.ooi .netlcheckout4.phtml>.

\* cited by examiner

ROBUST PAYMENT SETTLEMENTS USING DISTRIBUTED AND POTENTIALLY UNRELIABLE COMPUTER SYSTEMS

CROSS-REFERENCE TO RELATED APPLICATION

This application is related to U.S. patent application Ser. No. 11/197,925, filed Aug. 5, 2005, which is hereby incorporated herein by reference.

BACKGROUND OF THE INVENTION

1. Field of the Invention

This invention pertains to processing ecommerce financial transactions using a distributed system formed of potentially unreliable computers.

2. Description of the Related Art

Electronic commerce has become commonplace. Merchants conveniently offer goods and services by making them available at places like shopping centers, local grocery stores, and via the Internet. There are an even greater number of customers who purchase the goods and services. In many cases, the electronic commerce transactions involve physical goods. For example, many customers purchase items such as books, compact disks (CDs) and DVDs. Customers can also purchase electronic content such as downloadable text and/or music and access to web sites that provide news or entertainment stories.

Electronic commerce sites use electronic commerce payment systems to obtain payment information for transactions made by customers. Currently, credit cards and bank transfers are used for a majority of online transactions because of their convenience and reliability. Successful credit card transactions involve authorization and settlement phases, and bank transfers involve only the settlement phase. Authorization is a real time process by which the credit card issuer in a matter of seconds either approves or denies the transaction. Settlement is a batch process by which the authorized transactions are submitted to the credit card issuer for payment. Often the electronic commerce payment systems use third party vendors to perform settlement. These vendors receive transactions from one or more payment systems and submit batches of transactions to the credit card issuer for payment.

Electronic commerce payment systems handle millions of financial transactions everyday. Many payment systems use an expensive and highly-reliable machine (e.g., a mainframe computer) to batch and submit settlement requests to the vendor systems. However, such a machine constitutes a single point of failure and transaction processing can be brought to a halt if the machine fails. In addition, it is difficult to scale processing bandwidth without resorting to purchasing an additional, expensive machine. Thus, there is a need for a more flexible way to perform transaction processing.

BRIEF SUMMARY OF THE INVENTION

The above and other needs are met by a method, computer program product, and computer-implemented system that process settlement transaction on a distributed computer system. Embodiments of the method comprise receiving settlement data describing a settlement request and storing the settlement data in a settlement storage. The settlement storage includes a request status field with a value describing the status of the settlement request. The settlement data are stored in a vendor file responsive to the value of the request status field. Data describing the vendor file are stored in a vendor file information storage. The vendor file information storage includes a file status field with a value describing the status of the vendor file. The vendor file is provided to a vendor for settlement processing responsive to the value of the file status field.

Embodiments of the computer program product and computer-implemented system comprise a request handler module configured to receive and store settlement data describing a settlement request in a settlement storage. The settlement storage includes a request status field with a value describing the status of the settlement request. A batch handler module is configured to store the settlement data in a vendor file responsive to the value of the request status field. The batch handler is further configured to store data describing the vendor file in a vendor file information storage. The vendor file information storage includes a file status field with a value describing the status of the vendor file. A vendor communication module is configured to provide the vendor file to a vendor for settlement processing responsive to the value of the file status field.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

I. Overview

Figure 1:
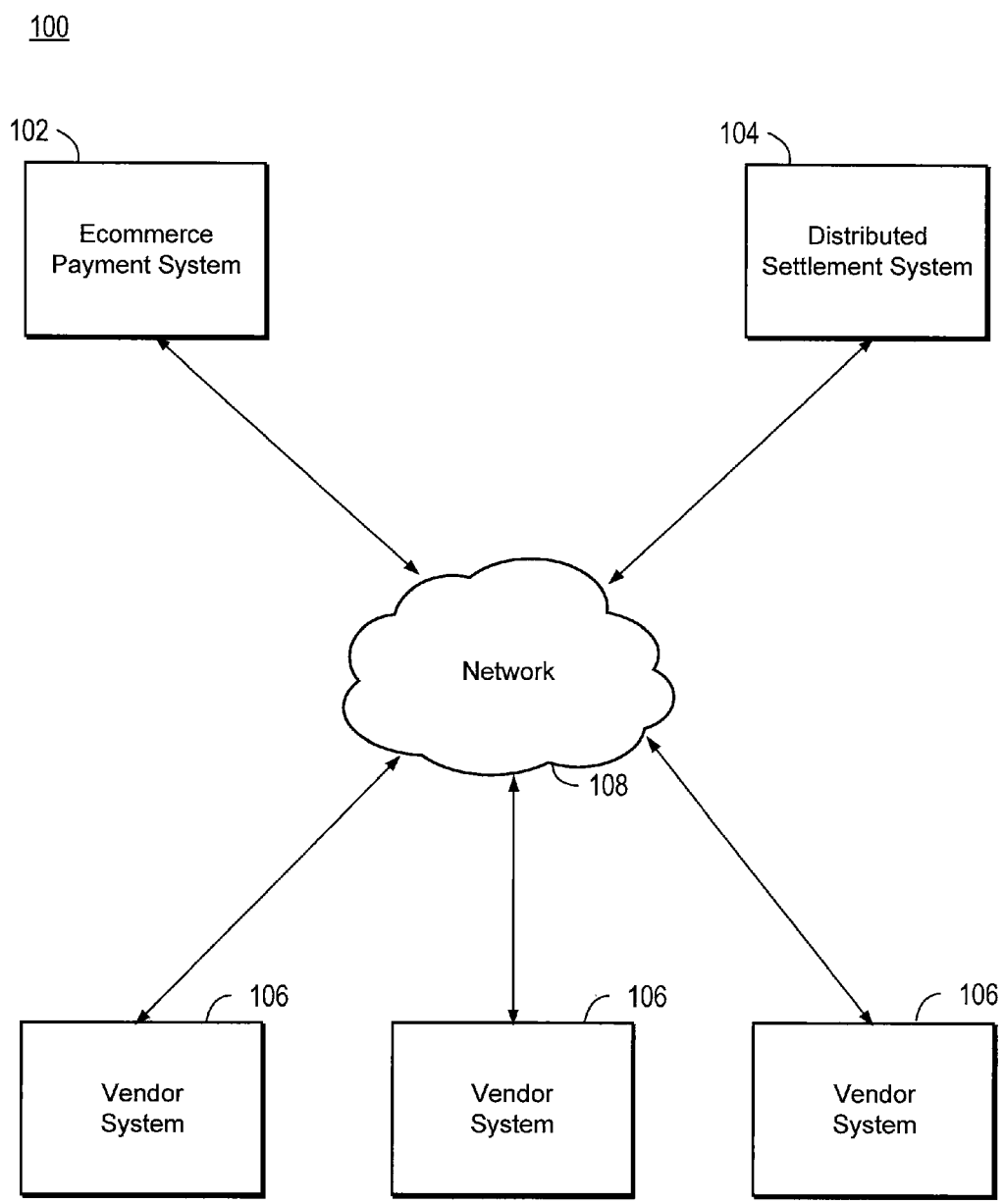
FIG. 1 is a high-level block diagram of a credit card transaction settlement environment according to one embodiment.

FIG. 1 is a high-level block diagram of a credit card transaction settlement transaction environment according to one embodiment. FIG. 1 illustrates an ecommerce payment system 102, a distributed settlement system 104, and multiple vendor systems connected by a network 108.

The ecommerce payment system 102 represents a system used by customers to provide a merchant with payment information for a transaction. The ecommerce payment system 102 receives payment information from customers for transactions, authorizes transactions, and works with other systems coupled to the network 108 to credit merchants for authorized transactions. It should be understood that multiple ecommerce payment systems may be coupled to the network 108. In one embodiment, the ecommerce payment system 102 is used for providing payment information to a specific merchant. In another embodiment, the ecommerce payment system 102 is used to provide multiple merchants with payment information. An example of the latter system is GOOGLE CHECKOUT from GOOGLE INC. of Mountain View, Calif.

The distributed settlement system 104 serves as an intermediary between the ecommerce payment system 102 and the vendor systems 106. In one embodiment, the distributed settlement system batches settlement requests from the ecommerce payment system 102 according to an intended vendor system 106 and transmits the batched settlement requests to the intended vendor system 106. Although FIG. 1 shows only 3 vendors systems 106, the distributed settlement system can communicate with any number of vendor systems 106. The distributed settlement system 104 is not limited to only being the intermediary between the ecommerce payment system 102 and the vendor systems 106. In one embodiment, the distributed settlement system 104 directly communicates with a credit card issuer coupled to the network 108 instead of communicating with a vendor.

The distributed settlement system 104 is comprised of multiple discrete computers working together to perform the functions described herein. In one embodiment, each computer is a conventional computer running a standard operating system such as a variant of LINUX. The discrete computers of the distributed settlement system 104 communicate with each other via an internal network (not shown). The processing capacity of the distributed settlement system 104 can be increased by adding additional computers to the distributed settlement system 104. Because the computers that form the distributed settlement system 104 are conventional computers, they can suffer from a variety of faults due to component failures and the like. The distributed settlement system 104 includes functionality that detects if a failing computer causes a processing error and gracefully accounts for the error and allows processing to continue.

The vendor system 106 represents an entity that serves as an intermediary between the distributed settlement system 104 and credit card issuers. In one embodiment, the vendor system 106 receives a file from the distributed settlement system 104 containing multiple settlement requests. The vendor system 106 batches the settlement requests from the distributed settlement system 104 with settlement requests from other settlement systems and transmits the request to the appropriate credit card issuer. The vendor system 106 receives information back from the credit card issuer regarding whether each settlement request completed or failed. The vendor system 106 relays the information to the appropriate settlement system.

The network 108 represents the communication pathways between the ecommerce payment system 102, distributed settlement system 104, and vendor systems 106. In one embodiment, the network 108 is the Internet. The network 108 can also utilize dedicated or private communications links that are not necessarily part of the Internet. In one embodiment, the network 108 uses standard communications technologies and/or protocols. Thus, the network 108 can include links using technologies such as Ethernet, 802.11, integrated services digital network (ISDN), digital subscriber line (DSL), asynchronous transfer mode (ATM), etc. Similarly, the networking protocols used on the network 108 can include the transmission control protocol/Internet protocol (TCP/IP), the hypertext transport protocol (HTTP), the simple mail transfer protocol (SMTP), the file transfer protocol (FTP), etc. The data exchanged over the network 108 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

II. System Architecture

Figure 2:
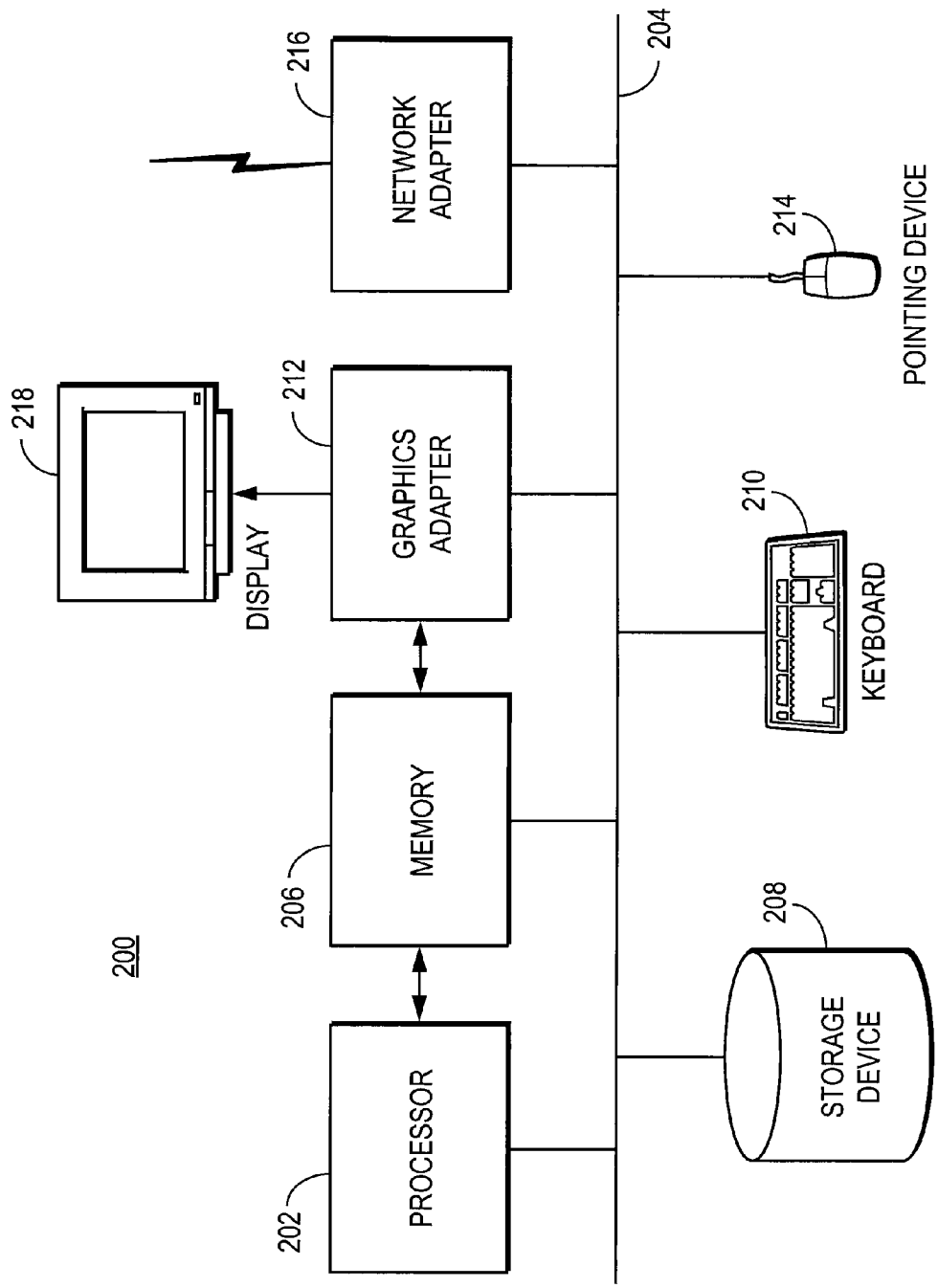
FIG. 2 is a high-level block diagram illustrating a functional view of a typical computer for use as one of the entities illustrated in the environment of FIG. 1 according to an embodiment.

FIG. 2 is a high-level block diagram illustrating a functional view of a typical computer system 200 for use as one of the entities illustrated in the environment 100 of FIG. 1 according to an embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 108.

As is known in the art, the computer 200 is adapted to execute computer program modules. The term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 utilized by the ecommerce payment system 102, the distributed settlement system 104, and the vendor systems 106 vary depending upon the embodiment and the processing power utilized by each of the entities. It should be understood that not all components (e.g., display 218, keyboard 210) of the computer 200 are needed for the functionality of some of the entities in FIG. 1. For example, each conventional computer of the distributed settlement system 104 can be a blade server.

Figure 3:
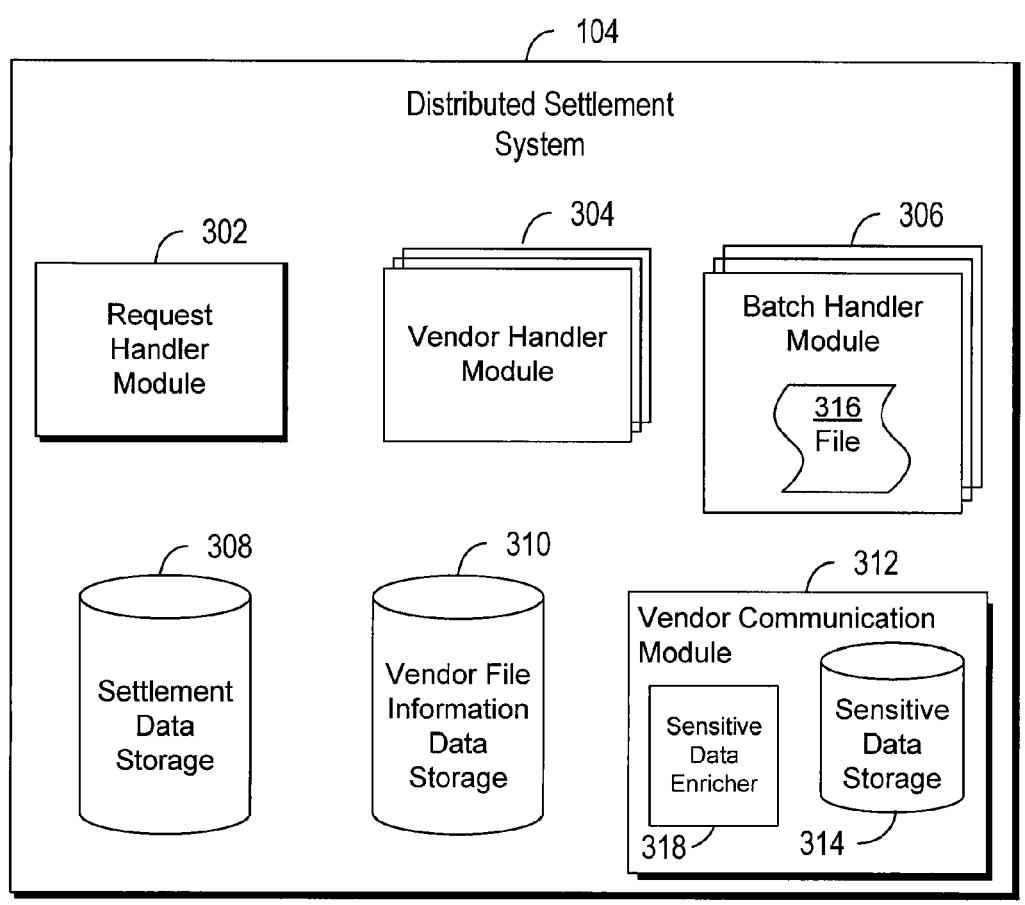
FIG. 3 is a high-level block diagram illustrating the distributed settlement system according to one embodiment.

FIG. 3 is a high-level block diagram illustrating the distributed settlement system 104 according to one embodiment. The distributed settlement system 104 includes an assortment of modules and data storages. Those of skill in the art will recognize that other embodiments can have different and/or other modules or data storages than the ones described here, and that the functionalities can be distributed among them in different manners. It should be understood that a distributed settlement system 104 may contain a plurality of modules and/or data storages that perform the same functions in the distributed settlement system 104.

As shown in FIG. 3, the distributed settlement system 104 includes a request handler module 302 that receives settlement requests from the ecommerce payment system 102. The settlement requests received by the request handler module 302 contain a variety of data that are used to process the settlement request. Depending upon the embodiment, the data may include: the issuer of the credit card used to complete a transaction; the merchant to credit for the transaction;

the amount to credit the merchant; an identification of the customer that completed the transaction; and the like.

In one embodiment, the request handler module 302 performs preliminary sanity checks on the requests received. A sanity check is a specific inspection done to a settlement request to validate that the request is proper and should be sent to a vendor system 106. An example of a sanity check is to check if the request is asking for a refund greater than the amount originally paid. Another example of a sanity check is to validate that a settlement request contains all of the required data. In one embodiment, if a settlement request does not pass the preliminary sanity checks, the request handler module 302 will not allow the settlement request to continue being processed.

The settlement data storage 308 is a persistent data storage in which the request handler module 302 stores received settlement requests. In one embodiment, the settlement data storage 308 is a highly-reliable distributed storage system for managing structured data. While FIG. 3 shows the settlement data storage 308 located within the distributed settlement system 104, an embodiment of the settlement data storage is distributed across multiple computer systems and accessed via the network 108. The settlement data storage 308 may also store data for systems other than the distributed settlement system 104. For example, the settlement data storage 308 can use a portion of the Bigtable storage system provided by Google Inc., as further described in U.S. patent application Ser. No. 11/197,925, which is incorporated by reference herein.

In one embodiment, the settlement data storage 308 includes a table having multiple rows and columns. The data for each settlement request are stored in a different row in the table. Each column of a row stores a type of data used in processing the settlement request.

A vendor handler module 304 periodically reads and formats new rows of data stored in the settlement data storage 308 by the request handler module 302. The data are reformatted according to the requirements of the vendor system 106 for which the data are destined. Additionally, the vendor handler module 304 may perform more exhaustive sanity checks on the data if required by the vendor system 106. Once the vendor handler module 304 has processed and formatted the data, the formatted data are placed back in the row from where the data were originally read. The vendor handler module 304 updates a "status" column in the row to indicate that it has formatted the row.

In one embodiment, there are multiple vendor handler modules and each vendor handler module 304 processes and formats rows of data for a specific vendor system 106, according to the vendor's requirements. A designated vendor handler module 304 will periodically search the settlement data storage 308 for unformatted rows of data intended for the vendor system 106 that the vendor handler module 304 handles. Upon finding a row that meets the criteria, the vendor handler module 304 formats the data accordingly. In one embodiment, a vendor handler module 304 contacts a vendor system 106 to receive requirement updates as to how to process and format data intended for the vendor system 106.

A batch handler module 306 periodically searches and reads the data from all formatted rows in the settlement data storage 308 intended for a specific vendor system 106. The batch handler module 306 uses the read formatted data to create a vendor-specific file 316 with the data of multiple settlement requests intended for the specific vendor system 106. The batch handler module 306 stores information regarding the vendor-specific file 116 in a vendor file information data storage 310. The information stored by the batch handler module 306 in the vendor file information data storage 310 includes information such as: the intended vendor system 106 of the vendor-specific file 316; identifying numbers of the settlement requests included in the vendor-specific file 316; and like. In one embodiment, the batch handler module 306 creates the vendor-specific file 316 by placing multiple settlement requests in a template customized for the specific vendor system 106 that will receive the file. In one embodiment, the batch handler module 306 inserts place holders in the vendor-specific file 316 that represent sensitive information. Sensitive information is information (e.g. customer's credit card number) that should be kept confidential to prevent potential malfeasance.

In one embodiment, there are multiple batch handler modules 306 and each batch handler module 306 creates vendor-specific files 316 for a different vendor system 106. A batch handler module 306 will periodically search the settlement data storage 308 for formatted rows of data intended for the vendor system 106 that the batch handler module 306 handles and creates the vendor-specific file 316 accordingly.

The vendor file information data storage 310 stores data and information pertaining to vendor-specific files created by the batch handler module 306. In one embodiment, the vendor file information data storage 310 is implemented as a database having rows and columns. Information pertaining to a vendor-specific file 316 created by the batch handler module 306 is stored in a new row in the vendor file information data storage 310. The columns of a row store data for the vendor-specific file 316, including data used for error checking purposes. In one embodiment, the vendor file information data storage 310 is the same database where the received settlement requests are stored.

The vendor communication module 312 handles all communication with vendor systems 106. The vendor communication module 312 receives the vendor-specific file 316 created by the batch handler module 306, encrypts the file 316, and uploads (sends) the file 316 to the to the vendor system 106 that will further process the settlement requests included in the vendor-specific file 316. In one embodiment, the vendor communication module 312 includes a sensitive data enricher 318 that enriches the file with sensitive data from a sensitive data storage 314 prior to the vendor-specific file being encrypted. In one embodiment, the vendor communication module 312 is maintained in a secure manner in order to prevent unauthorized access to the sensitive data. The sensitive data enricher 318 enriches the received vendor-specific file 316 by scanning the file for place holders, identifying the sensitive information required for each place holder, retrieving the data required from the sensitive data storage 314, and writing the sensitive data to the vendor-specific file 316 in place of the place holders. Once the vendor-specific file 316 has been enriched by the sensitive data enricher 318, the vendor communication module 312 encrypts and uploads the enriched file to the appropriate vendor system 106.

Subsequent to the vendor system 106 receiving the vendor-specific file 316, the vendor communication module 312 receives an acknowledgment file from the vendor system 106 that contains confirmation of receipt of the vendor-specific file 316 and information as to whether each settlement request included in the vendor-specific file 316 was accepted or failed. The vendor communication module 312 sends the acknowledgment file to the batch handler module 306. The batch handler module 306 uses the information in the acknowledgment file to update the rows for each settlement request stored in the settlement data storage 308 as to whether the settlement request was completed or failed. In one embodiment, the batch handler module 306 that receives the acknowledgment file is different than the batch handler module 306 that created the vendor-specific file 316.

Figure 4:
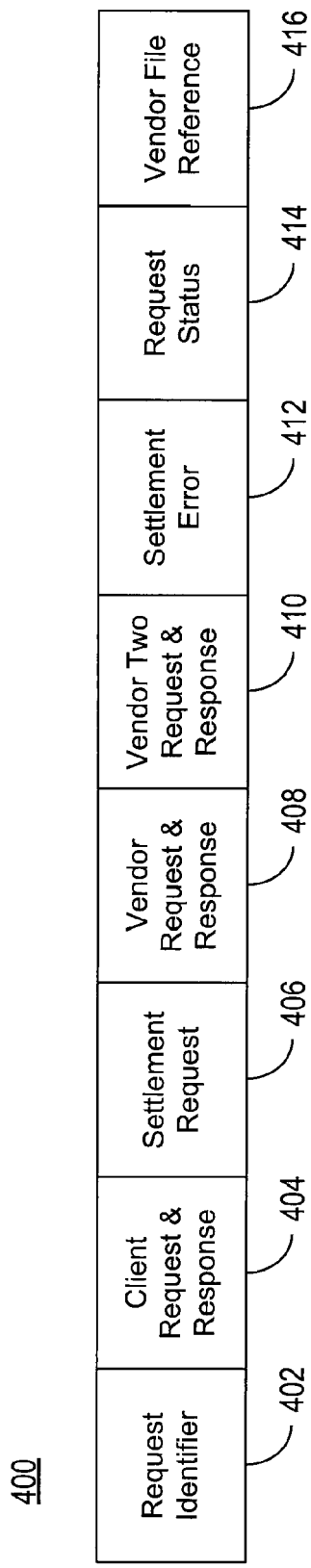
FIG. 4 is a high-level block diagram illustrating column fields within a row of a table in the settlement data storage according to one embodiment.

FIG. 4 is a high-level block diagram illustrating column fields within a row 400 of a table in the settlement data storage 308 according to one embodiment. Those of skill in the art will recognize that other embodiments can have different and/or other columns in a row 400 of the settlement data storage 308, and that the columns can be used in different manners. It should be understood that a row 400 of data exist in the settlement data storage 308 for every settlement request being processed by the distributed settlement system 104.

A request identifier 402 column contains the unique identifier (e.g., number) assigned to an individual settlement request. No two rows 400 in the settlement data storage 308 contain the same identifier in the request identifier column 402. A client request and response column 404 contains the exact data received from the ecommerce payment system 102 for a settlement request. Additionally, the client request and response column 404 contains data pertaining to the ecommerce payment system 102 that transmitted the settlement request to the distributed settlement system 104. In one embodiment, the data stored in the client request and response is never modified.

A settlement request column 406 contains the exact data received from the ecommerce payment system 102 that pertains only to the settlement request. The settlement request column 406 contains only data that must be sent out to a vendor system 106. For example, the client request and response column 404 may contain data as to the ecommerce payment system 102 that submitted the settlement request, the time and date the request was received along with settlement request data. On the other hand, the settlement request column 406 may contain information as to the name of the customer, the amount of the transaction, the vendor who will process the settlement request, and other relevant settlement request information.

A vendor request and response column 408 contains the data stored in the settlement request column 406, but the data in the vendor request and response column 408 is formatted according to the vendor for which the settlement request data are intended. Multiple vendor request and response columns exist in the rows 400 of the settlement data storage 308, one column for every vendor system 106 that the distributed settlement system communicates with. Only the vendor request and response column of the vendor system 106 for which the settlement request data are intended will contain the formatted settlement request data. FIG. 4 shows a vendor two request and response column 410 in order to illustrate that a row 400 in the settlement data storage 308 may contain multiple vendor request and response columns. In the situation of FIG. 4, if the data contained in the settlement request column 406 were intended for vendor two a formatted version of the settlement request would be stored in the vendor two request and response column 410, which means that the vendor request and response column 408 would not contain any data.

A settlement error column 412 is populated with data if a vendor system 106 that received the settlement request rejected the settlement request. The data stored in the settlement error column 412 could be a simple error code or could be a detailed explanation as to why the settlement request was rejected by the vendor system 106. A request status column 414 maintains state information describing the state of the settlement request as it is being processed by the distributed settlement system 104. The state information of the request status column 414 allows the different modules of the distributed settlement system 104 to determine which rows 400 in the settlement data storage 308 need to be processed by a specific module. Additionally, the request status column 414 is used for error detection and recovery. Generally, errors or malfunctions in the distributed settlement system 104 are detected due to the request status column 414 not changing to its expected value after a specified length of time. Once the error is detected, the distributed settlement system 104 is able to rectify the error.

A vendor file reference column 416 maintains a reference to a vendor-specific file 316 in which a settlement request of the respective row 400 is included. In one embodiment, the reference contained in the vendor file reference column 416 is a unique identifier assigned to the vendor-specific file 316 that contains the settlement request.

Figure 5:
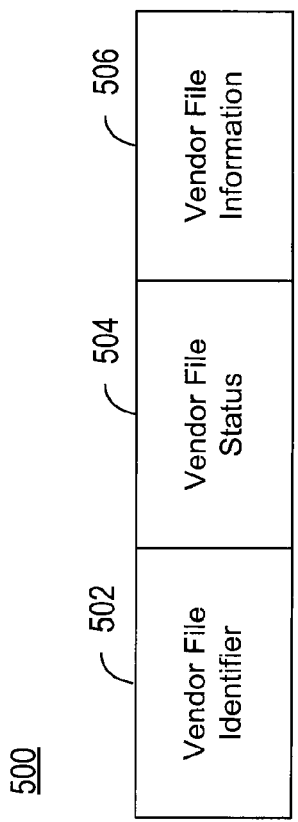
FIG. 5 is a high-level block diagram illustrating column fields within a row of a table in the vendor file information data storage according to one embodiment

FIG. 5 is a high-level block diagram illustrating column fields within a row 500 of a table in the vendor file information data storage 310 according to one embodiment. Those of skill in the art will recognize that other embodiments can have different and/or other columns in a row 500 of the vendor file information data storage 310, and that the columns can be used in different manners. It should be understood that each individual vendor-specific file 316 has a respective row 500 in the vendor file information data storage 310.

A vendor file identifier column 502 contains the unique identifier assigned to a vendor-specific file 316. No two rows 500 in the vendor file information data storage 310 contain the same identifier in the vendor file identifier column 502. A vendor file status column 504 maintains state information describing the state of the vendor-specific file 316 as it is being processed by the distributed settlement system 104. The vendor file status column 504 is used for error detection and recovery. Generally, errors or malfunctions in the creation and processing of a vendor-specific file 316 are detected due to the vendor file status column 504 not changing to its expected value after a specified length of time. Once the error is detected, the distributed settlement system 104 is able to rectify the error.

A vendor file information column 506 contains information about the vendor-specific file 316 of the respective row 500. An example of the types of information that the vendor file information column 506 may contain regarding a vendor-specific file 316 could be the name of the vendor-specific file 316, the date and time the file was created, the identifying numbers of the multiple settlement requests included in the batch file, and the like.

III. Process

Figure 6A:
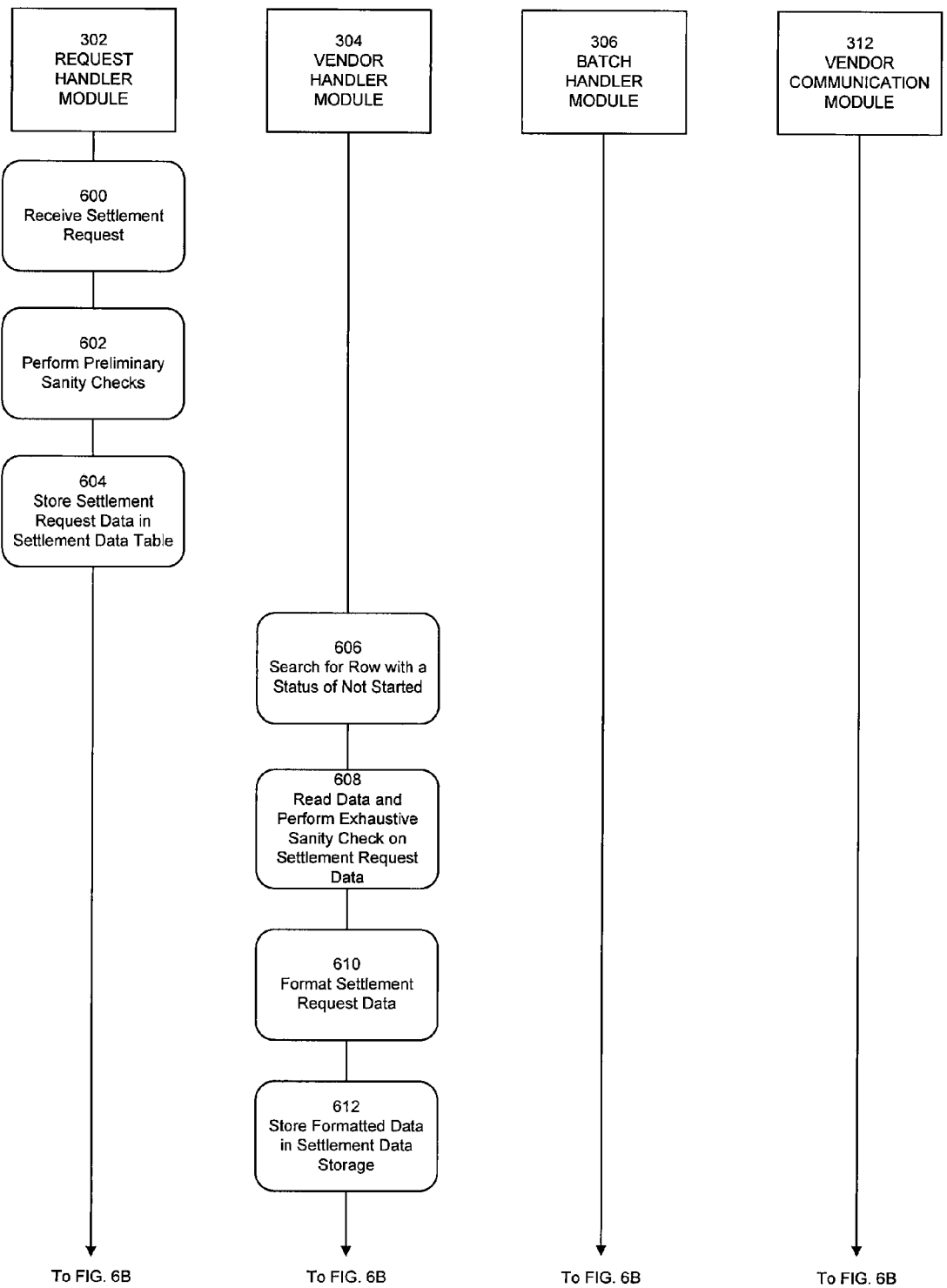
FIGS. 6A, 6B, and 6C are sequence diagrams illustrating the processing of credit card settlements according to one embodiment.
Figure 6B:
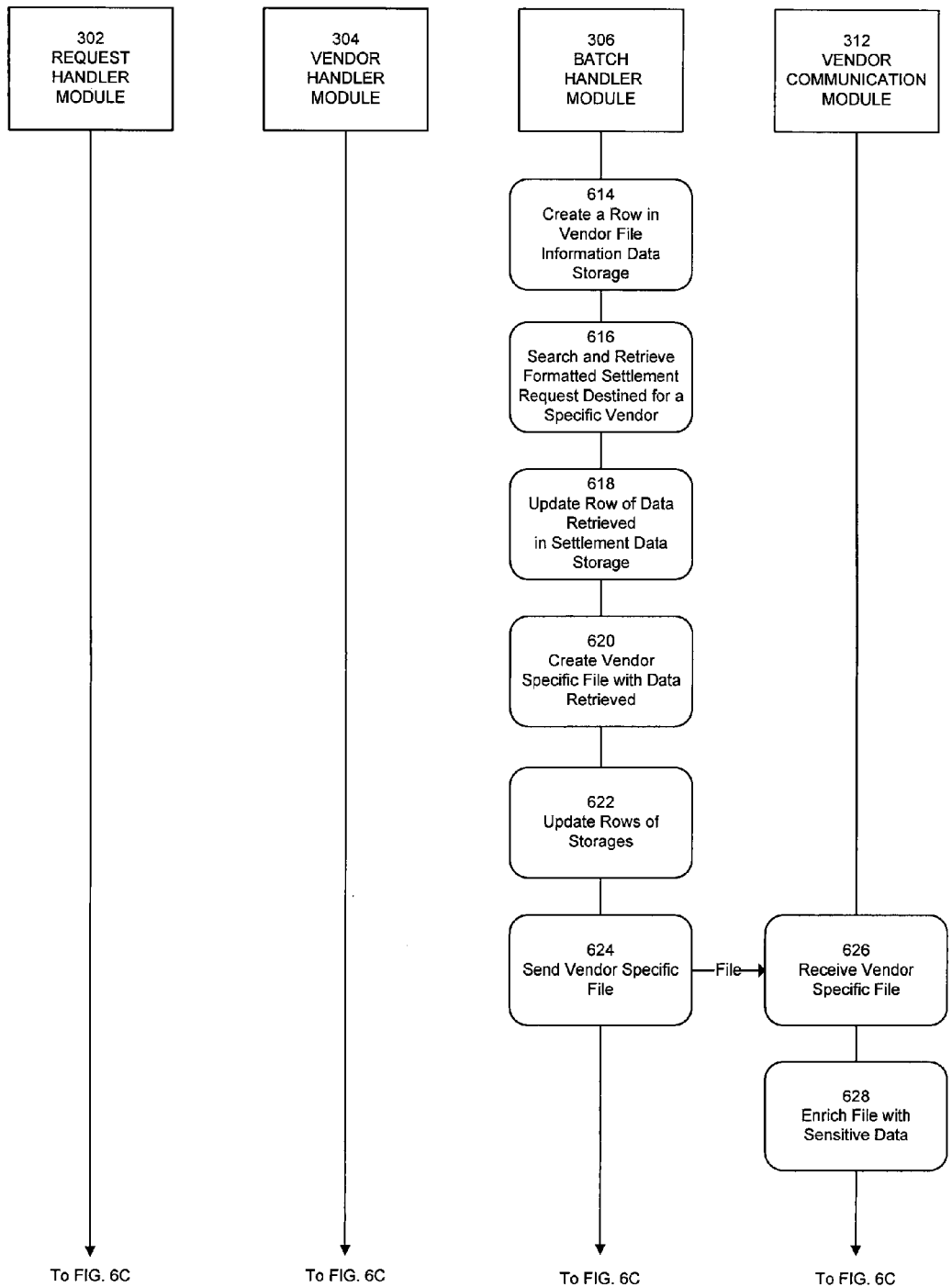
Figure 6C:
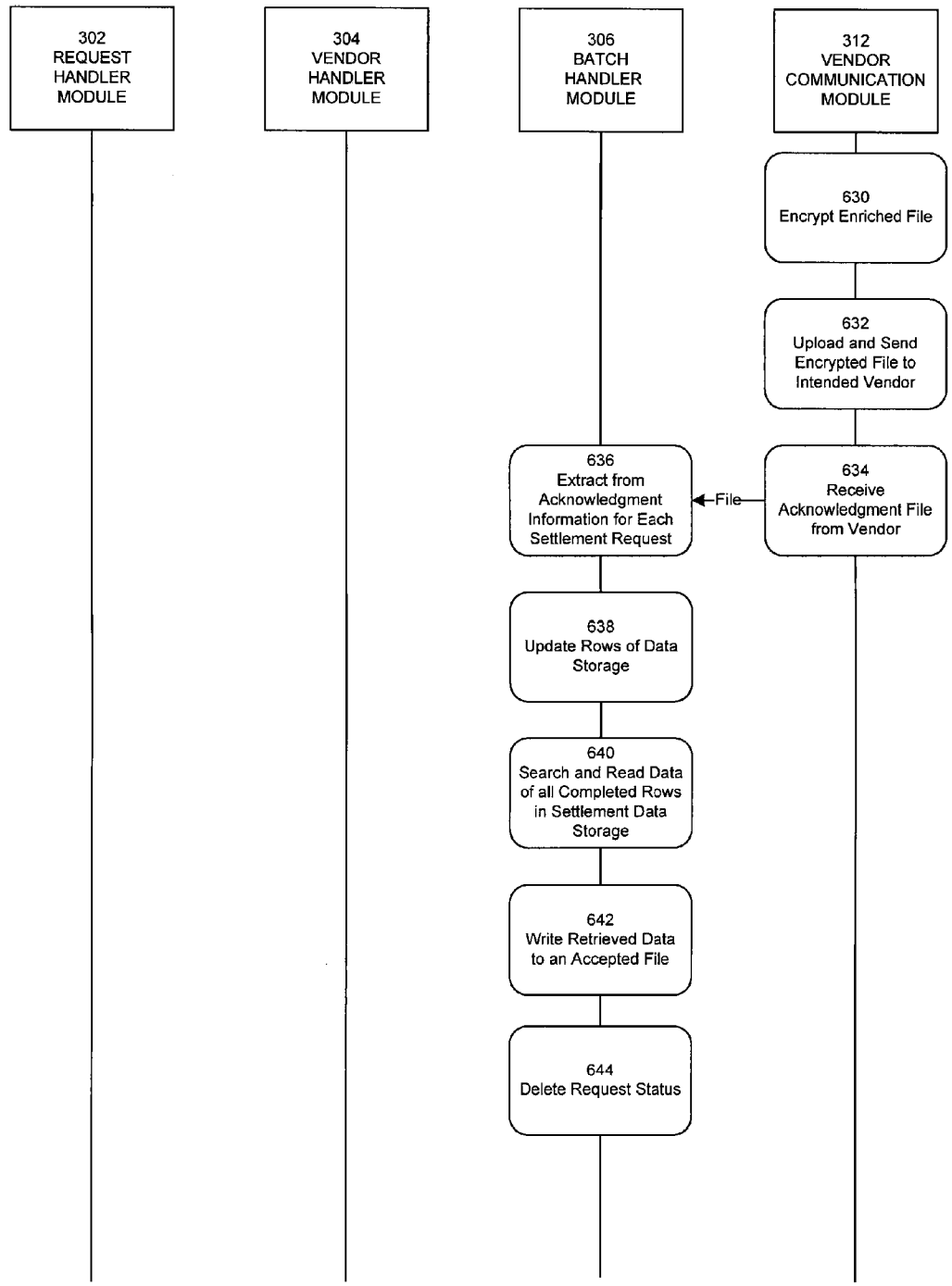

FIGS. 6A, 6B, and 6C are sequence diagrams illustrating the processing of credit card settlements according to one embodiment. Those of skill in the art will recognize that other embodiments can perform the steps of FIGS. 6A, 6B, and 6C in different orders. Moreover, other embodiments can include different and/or additional steps than the ones described here.

FIGS. 6A, 6B, and 6C illustrate steps performed by the different modules of the distributed settlement system 104 in processing a settlement request. Assume for purposes of this example that a customer makes a transaction (e.g., purchase of an item) using a credit card, the transaction has already been authorized and now the distributed settlement system 104 receives a settlement request from the ecommerce payment system 102.

Beginning in FIG. 6A, the request handler module 302 receives 600 the settlement request from the ecommerce payment system 102. The request handler module 302 performs 602 preliminary sanity checks on the settlement request. If the settlement request does not pass the preliminary sanity checks, the settlement request is not processed by the distributed settlement system 104. In one embodiment, the ecommerce payment system 102 is notified of the settlement request being rejected. If the settlement request does pass all of the preliminary sanity checks, the request handler module 302 creates a new row in the settlement data storage 308 for the settlement request and stores 604 the settlement request data received in the row. The settlement request data are stored 604 in the client request and response column 404 and the settlement request column 406. Additionally, the request handler module 302 writes a unique identifier to the request identifier column 402 and sets the request status column 414 of the row to "not started". In one embodiment, the request identifier written in the request identifier column 402 is transmitted by the request handler module 302 to the ecommerce payment system 102 as acknowledgment of the receipt of the settlement request.

Periodically, the vendor handler module 304 searches 606 the settlement data storage for rows that contain a status in the request status column 414 of "not started". Upon finding a row with that status, the vendor handler module 304 reads 608 the settlement request data from the settlement request column 406 of the row and sets the status request column 414 to "processing". The vendor handler module 304 performs more exhaustive sanity checks on the settlement request data and, based on the settlement request data, the vendor handler module 304 determines which vendor system 106 will further process the settlement request. In one embodiment, the sanity checks performed by the vendor handler module 304 are performed according to requirements of the vendor system 106 that will receive the settlement request.

If the settlement request is acceptable according to the exhaustive sanity checks, the data are formatted 610 by the vendor handler module 304 according to the requirements of the vendor system 106 that will receive the settlement request. The formatted settlement request data are stored 612 in the same row from where the data were originally read. The formatted data are specifically stored in the vendor request and response column 408. Additionally, once the settlement request data are stored in the vendor request and response column 408, the vendor handler module 304 sets the request status column to "processed".

In one embodiment, the vendor handler module 304 scans for previous errors or malfunctions prior to executing step 606. The vendor handler module 304 is able to determine if in an error or malfunction occurs within the vendor handler module 304 if a row 400 in the settlement data storage 308 takes longer than a set amount of time for the status of the request status column 414 to change from "processing" to "processed". If the vendor handler module 304 identifies a row 400 in the settlement data storage 308 that has maintained a status of "processing" for longer than a set amount of time, it signifies to the vendor handler module 304 that an error or malfunction occurred with the vendor handler module 304 while it processed the settlement request of the respective row 400. The vendor handler module 304 rectifies the error by reading the settlement request data from the settlement request column 406 of the row 400 and performing exhaustive sanity checks. If the settlement request is considered acceptable based on the exhaustive sanity checks, the data are formatted, the formatted data are stored in the vendor request and response column 408, and the status column is set to "processed".

Periodically, the batch handler module 306 creates 614 a new row 500 in the vendor file information data storage 310, and places a unique identifier in the vendor file identifier column 502 of the row. The batch handler module 306 sets the status of the vendor file status column 504 in the newly created row 500 to "creating". The batch handler module 306 searches 616 the settlement data storage 308 for rows with settlement requests that are destined for the same vendor system 106 and where the status in the request status column 414 is set to "processed". The batch handler module 306 reads the formatted settlement request data from the vendor request and response column 408 of every row 400 that meets the criteria. From every row 400 in the settlement data storage 308 from which the batch handler module 306 reads the formatted settlement request data, the batch handler module 306 writes 618 in the vendor file reference column 416 the unique identifier of the newly created row 500 in the vendor file information data storage 310. Additionally, the batch handler module 306 sets the status of the request status column 414 to "in progress".

The batch handler module 306 writes all of the read formatted settlement request data into a template to create 620 a vendor-specific file 316. In one embodiment, the template is unique to the vendor system 106 that will receive the settlement requests. The batch handler module 306 additionally includes in the vendor-specific file 316 place holders for sensitive data.

The batch handler module 306 updates 622 the status of the vendor file status column 504 to "created" and includes data describing the newly created vendor-specific file 316 in the vendor file information column 506 of the row 500. Examples of the data included in the vendor file information column 506 is the date and time the vendor-specific file 316 was created, identifying numbers of the settlement requests included in the file, and other information relevant to the vendor-specific file 316. The batch handler module 306 transmits the vendor-specific file 316 to the vendor communication module 312.

The batch handler module 306 accounts for malfunctions or errors prior to step 614 by searching the vendor file information data storage 310 for any rows of data that have had the vendor file status column 504 set to "creating" for longer than a set amount of time. If a row 500 has remained with the status of "creating" for longer than a set amount of time, the batch handler module 306 determines that a previous error or malfunction occurred. A detected previous error or malfunction causes the batch handler module 306 to search the settlement data storage 308 for any rows with the status in the request status column 414 set to "in progress" and with an identifier in the vendor file reference column 416 that is the same to that of the vendor file identifier column 502 of the row 500 with the status of "creating". If the batch handler module 306 does not find any rows 400 in the settlement data storage 308 that meet these criteria, it means that the error or malfunction in the batch handler module 306 occurred prior to creating a vendor-specific file 316. If this is the case, the batch handler module 306 can proceed as it normally would by performing steps 614-624.

On the other hand, if the batch handler module 306 finds one or more rows that meet the criteria, the batch handler module 306 rectifies the error by reading the formatted settlement request data from the vendor request and response column 408 of all of the rows that meet the criteria. The read formatted settlement request data are used to create a vendor-specific file 316. After creating the vendor-specific file 316, the batch handler module 306 identifies the row 500 in the vendor file information data storage 310 with the status set to "creating" in the vendor file status column 504. Once the row 500 is identified, the status of the vendor file status column 504 of the row is changed to "created". Additionally, the vendor file information column 506 is updated with information about the vendor-specific file 316, and the vendor-specific file 316 is transmitted to the vendor communication module 312.

The vendor communication module 312 receives 626 the vendor-specific file 316. The sensitive data enricher 318 of the vendor communication module 312 enriches 628 the file by scanning the file for any place holders. Upon finding a place holder in the vendor-specific file 316, the sensitive data enricher 318 identifies the sensitive data that need to be written in place of the place holder. The sensitive data enricher 318 searches the sensitive data storage 314 for the sensitive data identified. Once the data are found, the sensitive data enricher 318 reads the data from the sensitive data storage 314 and writes the data in place of the place holder. Once the vendor-specific file 316 is fully enriched, the enriched vendor-specific file 316 is encrypted 630 by the vendor communication module 312. The vendor communication module 312 uploads 632 the encrypted vendor-specific file 316 to the intended vendor system 106. The vendor system 106 continues the processing of the encrypted file.

Prior to the upload of the encrypted file, the vendor communication module 312 sets the status of the vendor-specific file 316 in the vendor file status column 504 to "uploading". After the vendor-specific file 316 is finished uploading and the file is transmitted to the intended vendor system 106, the vendor file status column 504 is set to "upload success" by the vendor communication module 312. If the vendor communication module 312 is unable to upload the vendor-specific file 316, the status of the vendor file status column 504 is set to "upload fail". In one embodiment, if the status of the vendor file status column 504 is set to "upload fail" a system administrator is notified.

If the vendor communication module 312 identifies a row 500 in the vendor file information data storage 310 that remains with the status of "uploading" in the vendor file status column 504 for longer than a set amount of time, the vendor communication module 312 is able to determine that an error or malfunction occurred within the vendor communication module 312 during the upload of the vendor-specific file 316. If the vendor communication module 312 were operating correctly during the upload of the vendor-specific file 316, the status of the vendor file status column 504 would have changed from "uploading" to "upload success" or "upload fail" in a timely manner. The vendor communication module 312 rectifies the error by once again uploading and transmitting the vendor-specific file 316 of the respective row 500 to the appropriate vendor system 106.

The vendor communication module 312 receives 634 an acknowledgment file from the vendor system 106 that received the vendor-specific file 316. The acknowledgment file includes acknowledgment information as to whether each settlement request included in the vendor-specific file 316 was accepted or rejected. The vendor communication module 312 sends the acknowledgment file to the batch handler module 306. The batch handler module 306 extracts 636 the acknowledgment information for each settlement request and updates 638 the vendor file status column 504 of the vendor-specific file 316 to "processed". The batch handler module 306 uses the extracted acknowledgment information to update the request status column 414 and the vendor request and response column 408 in the respective row 400 of each settlement request identified in the acknowledgment file.

The row of each settlement request is updated by using the request identifier of the settlement request to find the correct row in the settlement data storage 308. Once the correct row is found, the requests status column 414 of the row is set to "Completed" if the acknowledgment information indicates the settlement request was accepted. If the settlement request was rejected by the vendor system 106, the request status column 414 is set to "Error" and information as to why the settlement request was rejected is written into the settlement error column 412. In one embodiment, if a settlement request is rejected, a system administrator is notified. The system administrator may attempt to rectify the error in the data in order to allow the settlement request to be processed. If the error occurs with sensitive data, the system administrator may not be able to modify the data due to legal and/or regulatory restrictions. Additionally, regardless as to whether a settlement request was accepted or rejected the vendor request and response column 408 is updated to include the respective acknowledgment information.

Periodically, the batch handler module 306 searches 640 all rows in the settlement data storage 308 for rows 400 with the status in the request status column 414 of "completed". The data contained within the vendor request and response column 408 of every row with the status in the request status column 414 of "completed" is read and written 642 to an accepted file. The batch handler module 306 deletes 644 the status from the request status column 414 of every row 400 where data are read from by the vendor communication module 312. The status from the request status column 414 is erased for purposes of system optimization. By erasing the status from the request status column 414 modules in the distributed settlement system 104 are able to quickly find relevant data that needs to be processed. In one embodiment, the accepted file is stored by the batch handler module 306 in a storage device, transmitted to a system administer, and/or transmitted to the ecommerce payment system 102. In one embodiment, a rejected file is created by the batch handler module 306 in the same way the accepted file is created, except that the error file contains the data of all rows in the settlement data storage 308 with a status of error.

In sum, the distributed settlement system 104 is comprised of multiple discrete computers working together to perform the functions described. The distributed settlement system 104 is able detect and rectify in an automated manner processing errors that occur within the distributed settlement system 104. Because the distributed settlement system 104 can detect and rectify errors, conventional computers which have the potential to suffer from a variety of faults can be used to make up the distributed settlement system 104.

The scope of the invention is to be limited only by the following claims. From the above discussion, many variations will be apparent to one skilled in the relevant art that would yet be encompassed by the spirit and scope of the invention.

The invention claimed is:

1. A method for processing settlement transactions on a distributed computer system, comprising:
   storing, by the distributed computer system, settlement data corresponding to a plurality of settlement requests in a settlement storage, the settlement storage including for each of the plurality of settlement requests a request status field indicating a processing status of the settlement request, each of the plurality of settlement requests destined for at least one of a plurality of vendors;
   storing, by the distributed computer system, vendor data in a vendor file information storage describing a vendor file to be created for a vendor, the vendor file information storage including a file status field indicating a processing status of the vendor file, the file status field including a value indicating the vendor file is being created;
   creating, by the distributed computer system, the vendor file for the vendor, the vendor file including a set of settlement requests, from the plurality of settlement requests, destined for the vendor and which include a value in the requests' respective request status field indicating that settlement data of the request has been formatted for the vendor;

responsive to the file status field including the value indicating that the vendor file is being created for longer than a threshold time period, declaring that an error occurred in creating the vendor file and recreating, by the distributed computer system, the vendor file; and providing, by the distributed computer system, the vendor file to the vendor for processing the set of settlement requests.

2. The method of claim 1, further comprising:
responsive to the request status field of a settlement request destined for the vendor indicating that stored settlement data corresponding to the settlement request are not formatted for the vendor, processing the stored settlement data by:
  formatting the stored settlement data according to vendor specifications;
  storing the formatted settlement data in the settlement storage; and
  updating the request status field to indicate that the stored settlement data are formatted for the vendor.

3. The method of claim 1, further comprising:
declaring that an additional error occurred responsive to the request status field of a settlement request destined for the vendor not changing within a set time from indicating that stored settlement data corresponding to the settlement request are not formatted for the vendor to indicating that the stored settlement data are formatted; and
formatting the stored settlement data responsive to declaring the additional error occurred.

4. The method of claim 1, wherein creating the vendor file comprises:
identifying a template for the vendor file based at least in part on the vendor; and
storing settlement data of the set of settlement requests in the identified template.

5. The method of claim 1, further comprising:
responsive to including a settlement request, from the set of settlement requests, in the vendor file, updating the request status field of the settlement request to indicate that settlement data of the settlement request are stored in the vendor file.

6. The method of claim 1, wherein providing the vendor file to the vendor comprises:
enriching the vendor file with sensitive data;
encrypting the vendor file; and
sending the vendor file to the vendor.

7. The method of claim 6, wherein enriching the vendor file with sensitive data comprises:
identifying a place holder in the settlement data stored in the vendor file; and
replacing the placeholder in the vendor file with sensitive information represented by the place holder.

8. The method of claim 1, wherein providing the vendor file to the vendor comprises:
transmitting the vendor file to the vendor; and
updating the file status field to indicate that the vendor file was transmitted to the vendor.

9. The method of claim 1, further comprising:
declaring that an additional error occurred responsive to the file status field not changing within a set time from indicating the vendor file has not been sent to indicating the vendor file has been sent; and
initiating processing of the vendor file responsive to declaring the additional error occurred.

10. The method of claim 1, wherein the settlement storage comprises a table having multiple rows and columns, wherein each row stores settlement data corresponding to one of the plurality of settlement requests and the columns of the table represent fields of the settlement request.

11. A computer program product having a non-transitory computer-readable storage medium having computer-executable code for processing settlement transactions on a distributed computer system, the computer-executable code comprising:
a request handler module configured to store settlement data corresponding to a plurality of settlement requests in a settlement storage, the settlement storage including for each of the plurality of settlement requests a request status field indicating a processing status of the settlement request, each of the plurality of settlement requests destined for at least one of a plurality of vendors;
a batch handler module configured to:
  store vendor data in a vendor file information storage describing a vendor file to be created for a vendor, the vendor file information storage including a file status field indicating a processing status of the vendor file, the file status field including a value indicating the vendor file is being created;
  create the vendor file for the vendor, the vendor file including a set of settlement requests, from the plurality of settlement requests, destined for the vendor and which include a value in the requests' respective request status field indicating that settlement data of the request has been formatted for the vendor; and
  responsive to the file status field including the value indicating that the vendor file is being created for longer than a threshold time period, declare that an error occurred in creating the vendor file and recreate the vendor file; and
a vendor communication module configured to provide the vendor file to the vendor for processing the set of settlement requests.

12. A computer-implemented system for processing settlement transactions on a distributed computer system, the system comprising:
a computer processor; and
a non-transitory computer-readable storage medium storing computer program modules configured to execute on the computer processor, the computer program modules comprising:
  a request handler module configured to store settlement data corresponding to a plurality of settlement requests in a settlement storage, the settlement storage including for each of the plurality of settlement requests a request status field indicating a processing status of the settlement request, each of the plurality of settlement requests destined for at least one of a plurality of vendors;
  a batch handler module configured to:
    store vendor data in a vendor file information storage describing a vendor file to be created for a vendor, the vendor file information storage including a file status field indicating a processing status of the vendor file, the file status field including a value indicating the vendor file is being created;
    create the vendor file for the vendor, the vendor file including a set of settlement requests, from the plurality of settlement requests, destined for the vendor and which include a value in the requests' respective request status field indicating that settlement data of the request has been formatted for the vendor; and responsive to the file status field including the value indicating that the vendor file is being created for longer than a threshold time period, declare that an error occurred in creating the vendor file and recreate the vendor file; and a vendor communication module configured to provide the vendor file to the vendor for processing the set of settlement requests.

13. The method of claim 1, wherein the vendor file is provided to the vendor responsive to the files status field indicating that the vendor file is ready for transmittal to the vendor.

14. The computer program product of claim 11, further comprising a vendor handler module configured to:

declare that an additional error occurred responsive to the request status field of a settlement request destined for the vendor not changing within a set time from indicating that stored settlement data corresponding to the settlement request are not formatted for the vendor to indicating that the stored settlement data are formatted; and format the stored settlement data responsive to declaring the additional error occurred.

15. The computer program product of claim 11, wherein the vendor communication module is further configured to:

declare that an additional error occurred responsive to the file status field not changing within a set time from indicating the vendor file has not been sent to indicating the vendor file has been sent; and initiate processing of the vendor file responsive to declaring the error occurred.

16. The system of claim 12, further comprising a vendor handler module configured to:

declare that an additional error occurred responsive to the request status field of a settlement request destined for the vendor not changing within a set time from indicating that stored settlement data corresponding to the settlement request are not formatted for the vendor to indicating that the stored settlement data are formatted; and format the stored settlement data responsive to declaring the error occurred.

* * * * *